(12) United States Patent
Cardill

(10) Patent No.: US 6,233,951 B1
(45) Date of Patent: May 22, 2001

(54) HEATING, COOLING AND DE-HUMIDIFICATION SYSTEM FOR BUILDINGS

(76) Inventor: Daniel Cardill, 1664 Old Prescott Rd., Greely, Ontario (CA), K4P 1L4

( * ) Notice: Subject to any disclaimer, the term of this patent is extended or adjusted under 35 U.S.C. 154(b) by 0 days.

(21) Appl. No.: 09/213,222

(22) Filed: Dec. 17, 1998

(51) Int. Cl.$^7$ ............................................. F25B 47/02
(52) U.S. Cl. ........................ 62/81; 62/152; 62/238.6; 62/185; 62/277; 62/260; 237/2 B
(58) Field of Search ................. 62/81, 277, 278, 62/238.6, 238.7, 185, 434, 435, 436, 525, 152, 260; 237/2 B

(56) References Cited

U.S. PATENT DOCUMENTS

| | | | |
|---|---|---|---|
| 3,063,253 | * 11/1962 | Dickson et al. | 62/152 X |
| 3,664,150 | * 5/1972 | Patterson | 62/152 X |
| 4,002,201 | 1/1977 | Donaldson | 165/140 |
| 4,176,525 | 12/1979 | Tucker et al. | 62/238 R |
| 4,191,024 | 3/1980 | Machida | 62/80 |
| 4,288,993 | 9/1981 | van Mensvoort et al. | 62/333 |
| 4,332,137 | * 6/1982 | Hayes, Jr. | 62/81 |
| 4,633,676 | * 1/1987 | Dittell | 62/238.6 |
| 5,000,257 | 3/1991 | Shinmura | 165/140 |
| 5,570,585 | 11/1996 | Vaynberg | 62/175 |
| 5,575,159 | * 11/1996 | Dittell | 62/238.6 X |
| 5,586,444 | 12/1996 | Fung | 62/117 |
| 5,727,393 | * 3/1998 | Mahmoudzadeh | 62/81 |
| 5,921,092 | * 7/1999 | Behr et al. | 62/81 |

* cited by examiner

Primary Examiner—Harry B. Tanner
(74) Attorney, Agent, or Firm—Andrew, Hicks, Borden, Ladner, Gervois LLP

(57) ABSTRACT

A heat management system for a building having at least one cooling device is provided. The heat management system includes a refrigeration system in heat exchange contact with a cooling system for providing cooling energy to the cooling system and to the cooling device. The cooling system includes at least two independent flow paths in heat exchange contact with the cooling device for cooling the cooling device. In addition, the heat management system includes a defrost system in heat exchange contact with the cooling device through the independent flow paths wherein the defrost system can be operated to independently defrost each flow path of the cooling system. The system is efficient to operate in conjunction with a geothermal system and provides effective building atmosphere de-humidification.

15 Claims, 5 Drawing Sheets

HEATING, COOLING AND DE-HUMIDIFICATION SYSTEM FOR BUILDINGS

FIELD OF THE INVENTION

A heat management system for a building having at least one cooling device is provided. The heat management system includes a refrigeration system in heat exchange contact with a cooling system for providing cooling energy to the cooling system and to the cooling device. The cooling system includes at least two independent flow paths in heat exchange contact with the cooling device for cooling the cooling device. In addition, the heat management system includes a defrost system in heat exchange contact with the cooling device through the independent flow paths wherein the defrost system can be operated to independently defrost each flow path of the cooling system. The system is efficient to operate in conjunction with a geothermal system and provides effective building atmosphere de-humidification.

BACKGROUND OF THE INVENTION

Heating, cooling, and de-humidification systems within large buildings, such as grocery stores, are implemented to provide the multiple purposes of heating the building in winter, cooling the building in summer, cooling food products during both winter and summer and de-humidifying the building in the summer.

Normally, in the example of a grocery store, these systems are implemented independently of one another. For example, a primary food cooling system would be established to operate a grocery store's banks of freezers and coolers with its own system of refrigeration compressors, condensors and evaporators independently of a store's air conditioning system (having its own compressors, condensers and evaporators) which may also be independent of the store's heating system. In the summer, dehumidification systems may also be implemented to prevent the build-up of frost on food packages in open coolers or freezers.

With respect to a grocery store's cooling system for freezers and coolers, the evaporators or cooling coils of a food cooling system must be defrosted on a regular basis to ensure that the cooling system remains efficient. Specifically, refrigeration systems require frequent defrosting of the cooling coils of a freezer or cooler to remove frost which condenses on the cooling coils from the air passing over the cooling coils. In particular, open coolers or freezers are in contact with the air within a store and, accordingly, over time will circulate the humid air within the store through the cooler. On humid days, the condensation resulting from cooling can be substantial, resulting in significant frost build-up on both the cooling coils and the food products within the cooler/freezer. As frost builds up on the cooling coils, its effectiveness for cooling is reduced and, if left un-defrosted, will reduce the cooling efficiency of the cooler/freezer. Accordingly, regular defrosting of the coils is required to remove the frost from the coils. The defrosting cycle also contributes to the dehumidification of the store by the overall removal of water vapour from the atmosphere.

In a typical store, a defrost cycle is run every 6 hours wherein either the compressor is turned off and a defrost heater is activated to melt any condensed ice off the evaporator coils or the flow of refrigerant through the coils is reversed so that hot refrigerant is allowed to melt the frost build-up from the inside of the coil to the outside of the coil. In the case of an external heater, because heating is taking place externally and the heat transfer coefficient through air is low, the defrost cycle may take 30 minutes to complete such that the temperature within freezer or cooler may rise substantially thus increasing the risk of food spoilage as well as resulting in overall inefficient power consumption. During the defrost cycle, any melted water is allowed to drain away.

As indicated above, during this defrost process the temperature within the freezer/cooler may rise substantially to temperatures which affect the growth of micro-organisms on the food products resulting in an increased risk of food spoilage and the associated risk of food poisoning to the consumer. Furthermore, the repeated freeze—partial melt and re-freeze cycles in a freezer will have a significant impact on the shelf-life of the food products within the freezer often leading to a premature deterioration of the food and, hence, substantial wastage of the food. This leads to increased costs to both the store owner and consumer. In coolers, as opposed to freezers, this effect and the risk of food spoilage is more significant as the temperatures are higher.

In order to address the problems of inefficient defrost cycles, the use of water based cooling solutions have been proposed to provide a more efficient defrost cycle. In these systems, a gas-based refrigeration system is used to cool a water solution which is circulated through cooling cools in the freezer or cooler. The use of a water based solution for cooling has the effect of enabling rapid defrost cycles to be run, primarily as a result of the thermal mass of the water based solution. That is, in comparison with flowing a refrigerant gas through the cooling coils, the heat transfer coefficient for circulating a warm water-based liquid through the coiling coils is substantially greater than the heat transfer coefficient for circulating a warm refrigerant gas through the coiling coils.

Water based systems have permitted defrost cycles to be completed within a few minutes such that the temperature of the freezer or cooler does not rise to the same extent as with a refrigerant gas-based system. Furthermore, a water based cooling system allows a defrost cycle to be run every hour which minimizes the total amount of frost which may build up on a cooling coil over this time. This is compared to a gas based system which can only be defrosted every 4 hours or so due to the time required for a defrost cycle.

While a water based cooling system has advantages with respect to defrost cycles, the energy efficiency ratio (EER, measured in BTU(of cooling)/watts(energy utilized), and a measure of the cooling efficiency) remains similar to that of a conventional gas-based refrigeration system. In particular, refrigerant gas based cooling systems utilizing refrigerant gas to air heat transfer may have an EER in the order of 6 BTU/watt for a 0° F. (cooler temperature) to 140° F. (condenser temperature) thermal bridge while a water based cooling system utilizing water to air transfer under similar conditions would have a slightly lower EER.

As such, a number of problems exist with respect to prior art systems with respect to the ability of these systems to effectively provide efficient cooling of freezers and coolers, in combination with effective defrost systems, de-humidification systems and building heating and cooling systems.

For example, situations often exist where these independent systems work against one another or very inefficiently with respect to one another. This may involve, for example, air conditioners attempting to cool air including waste heat from a cooling system or defrosting system or waste heat from a cooling system not being utilized to heat the building in the winter.

Accordingly, there has been a need for a system which integrates all the heating and cooling systems of a building into an efficient system which effectively manages the transfer of heat between freezers, coolers, air conditioning, heating, dehumidification and defrost systems and in particular there has been a need for a system which does not allow the air temperature within a freezer/cooler to rise substantially during the defrost cycle and which allows for highly effective dehumidification of the building atmosphere. The development of such a system will also reduce the capital and maintenance costs associated with each of these systems.

Specifically, there has been a need for a geothermal based system integrated to the heating and cooling system of a building to provide improved overall system energy efficiency as well as a specific need for a dual flow path, water based cooling system which provides efficient defrosting cycles and which also provide effective dehumidification to a building atmosphere.

A review of the prior art has revealed that such a system has heretobefore not been realized. For example, U.S. Pat. No. 5,000,257 discloses a heat exchanger having a radiator and a condenser in proximal relationship with one another; U.S. Pat. 4,002,201 discloses a multiple fluid stacked heat exchanger; U.S. Pat. No. 4,176,525 discloses a combined environmental and refrigeration system for use in grocery stores and the like; U.S. Pat. No. 5,586,444 discloses a control system for multiple cooling case in a grocery store; U.S. Pat. No. 4,288,993 discloses a refrigeration system having primary and secondary refrigeration systems in heat exchanging contact with each other; U.S. Pat. No. 5,570,585 discloses a cooling system that operates to cool and store a product load having two compressor systems that are configured to operate independently or together as a single stage compressor; and, U.S. Pat. No. 4,191,024 discloses a defrosting method for use in a refrigeration system that alternately uses one of two coolers while the other is defrosting.

SUMMARY OF THE INVENTION

In accordance with the invention, there is provided a heat management system for a building having at least one cooling device, the heat management system comprising:
 a refrigeration system in heat exchange contact with a cooling system for providing cooling energy to the cooling system, the cooling system including at least two independent flow paths in heat exchange contact with the cooling device for cooling the cooling device; and,
 a defrost system in heat exchange contact with the cooling device through each respective independent flow path wherein the defrost system includes means to independently defrost each independent flow path.

In further and more specific embodiments of the invention, the independent flow paths include a plurality of cooling coils defining first and second sides of the cooling system wherein the first and second sides are positioned so as to partially overlap with the other side which preferably define a non-linear boundary. Still further, it is preferred that the cooling system includes an air flow system for circulating air over the cooling system for effecting heat transfer between the air and the cooling system and air flowing over the cooling system follows a tortuous path.

In still further embodiments, a cold storage system is operatively connected to the cooling system, the defrost system is in heat exchange contact with the refrigeration system to receive heat from the refrigeration system for defrosting and/or a heat storage system is operatively connected to the defrost system.

In a further embodiment the defrost system further includes a building heating system operatively connected to the defrost system for transferring heat to the building which may be a combination of a radiant floor heating system or a water/air heat pump system.

In another preferred embodiment,the system is further adapted to transfer waste heat from the refrigeration system and/or building to a geothermal system.

In accordance with a more specific embodiment of the invention, a heat management system is provided, the heat management system comprising:
 at least one cooling device;
 a refrigeration system in heat exchange contact with a cooling system for providing cooling energy to the cooling system, the cooling system including:
  at least two independent flow paths in heat exchange contact with the cooling device for cooling the cooling device;
  a plurality of cooling coils defining first and second sides of the cooling system wherein the first and second sides are positioned so as to partially overlap with the other side and define a non-linear boundary;
  an air flow system for circulating air over the cooling coils for effecting heat transfer between the air and the cooling system; and,
  a cold storage system operatively connected to the independent flow paths;
 a defrost system in heat exchange contact with the cooling device through each respective independent flow path, the defrost system also in heat exchange contact with the refrigeration system to receive heat from the refrigeration system for defrosting wherein the defrost system also includes means to independently defrost each independent flow path.

DETAILED DESCRIPTION OF THE INVENTION

Figure 1:
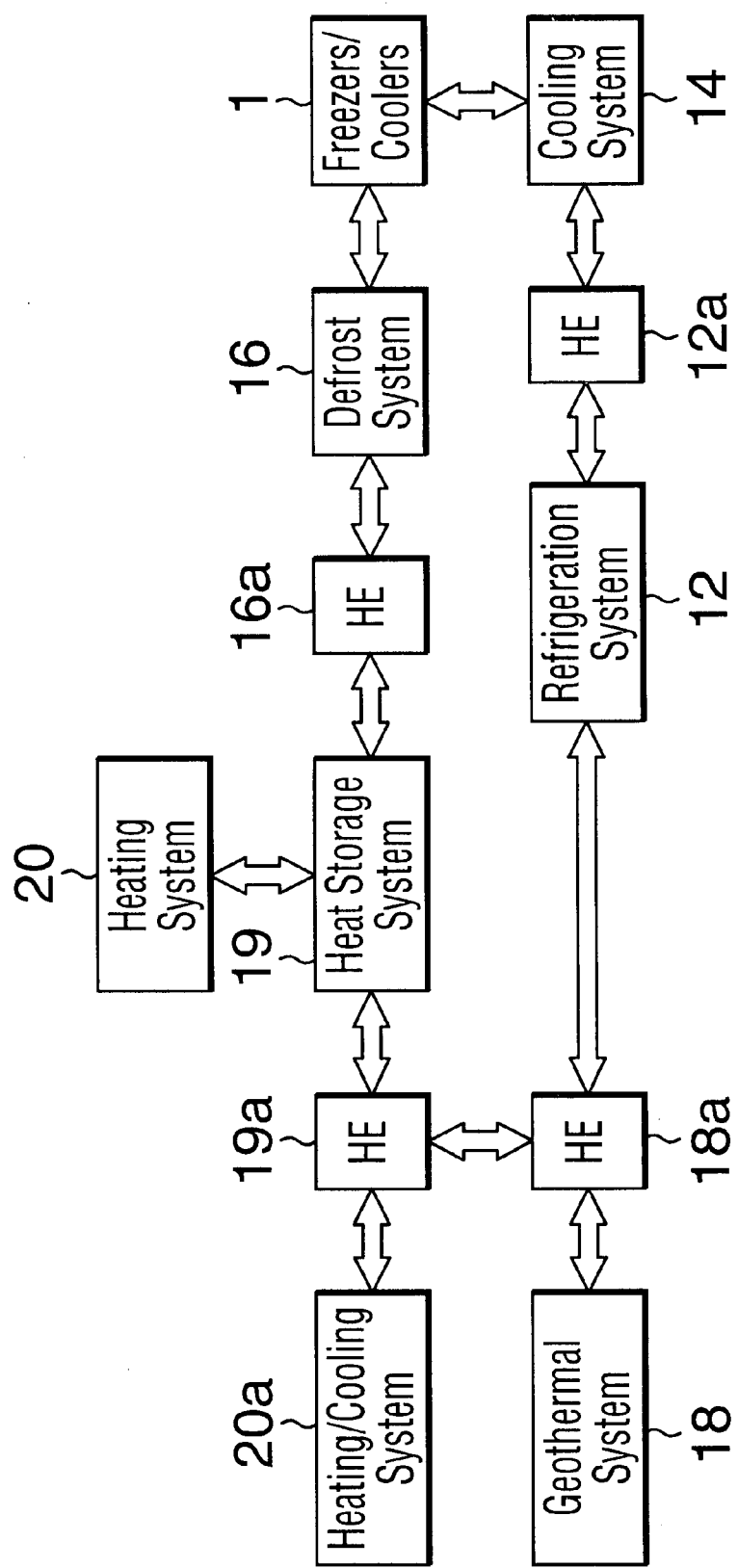
FIG. 1 is a schematic drawing of the heating, cooling and dehumidification system in accordance with the invention.

In accordance with the invention and with reference to FIG. 1, a heating and cooling system 10 for a building, such as a grocery store is shown. The heating and cooling system includes a number of systems which enable the efficient transfer of heat to allow:

1) the operation of coolers and freezers in the building;
2) the defrosting of the above coolers and freezers;
3) the efficient de-humidification of the building atmosphere;
4) the heating of the building; and,
5) the cooling of the building.

More specifically, the system 10 includes a refrigeration system 12, a water based cooling system 14, a defrost system 16, heat storage system 19 and an optional geothermal system 18 and optional building heating/cooling system 20. In order that heat transfer is enabled between each of these modules, appropriate system connectors including piping and valves, heat exchangers and heat storage systems are also provided. That is, the refrigeration system 12 is connected to the water cooling system 14 through a first heat exchanger 12a, the geothermal system 18 is connected to refrigeration system 12 through second heat exchanger 18a, the defrost system 16 is connected to the heat storage system 19 through a third heat exchanger 16a. Furthermore, heat exchanger 18a may be connected to a fourth heat exchanger 19a.

The system 10 operates to allow for the efficient transfer of heat to and from the ground for the purposes of heating or cooling a building. The system also operates to provide specific cooling capabilities to freezers and/or coolers and to efficiently de-humidify the building atmosphere.

More specifically, the refrigeration system 12 operates to transfer heat from the water based cooling system 14 to the ground through geothermal system 18, to the heat storage system 19 and building heating system 20 and/or to the defrost system 16, The defrost system 16 operates to transfer heat to the freezers/coolers 1 for defrosting and to de-humidify the building atmosphere. The heating system 20 and heating/cooling system 20a operate to transfer heat to the building atmosphere and/or cool the building atmosphere.

Figure 2:
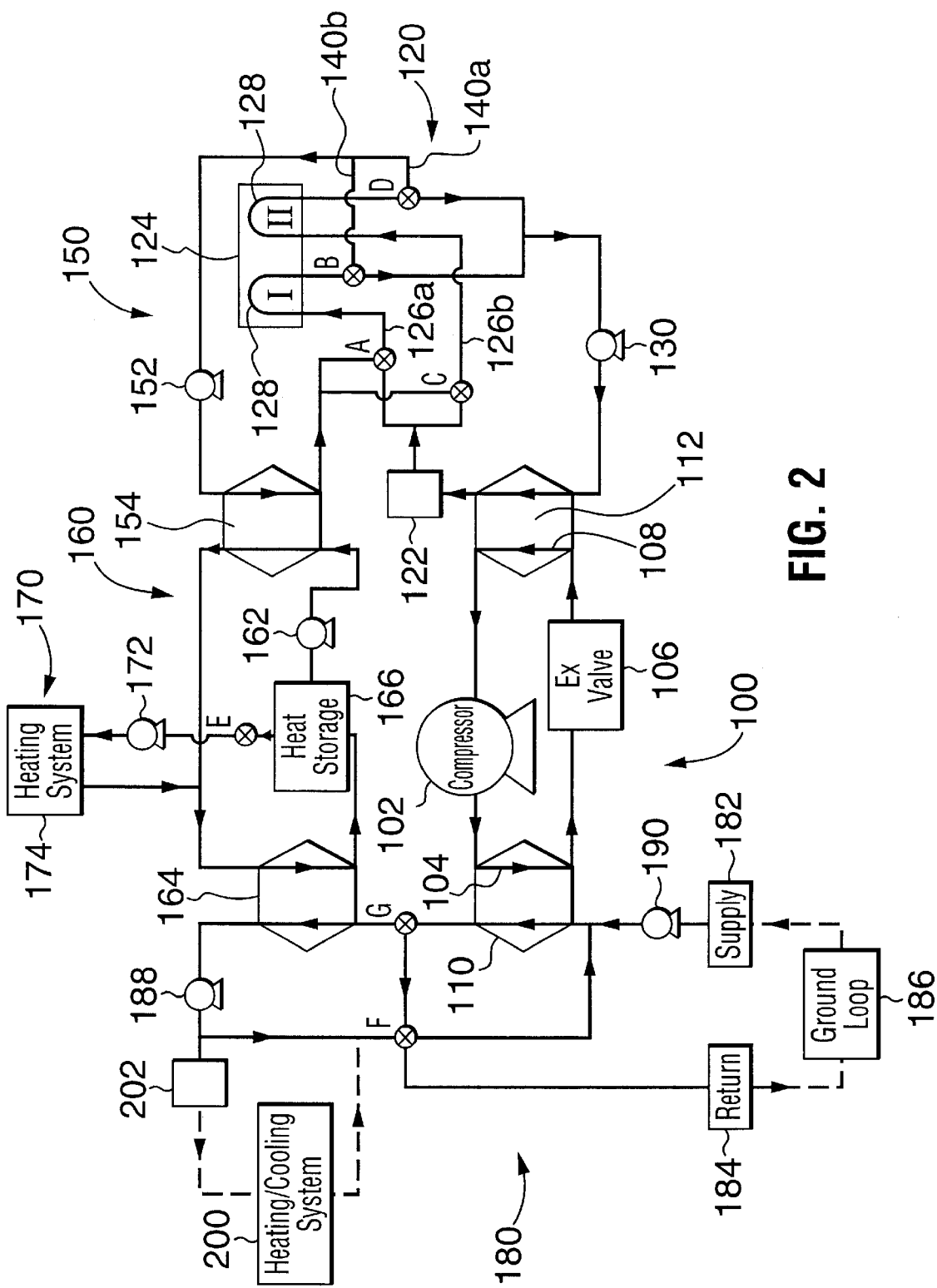
FIG. 2 is a schematic drawing of a specific embodiment of the heating, cooling and dehumidification system in accordance with the invention.

FIG. 2 shows details of an embodiment of a system which enables the operation of coolers and freezers in the building, the defrosting of the coolers and freezers, the efficient de-humidification of the building atmosphere and the optional heating and/or cooling of the building atmosphere.

In accordance with this embodiment, a basic refrigeration system 100 is provided including a compressor 102, condenser 104, expansion valve 106, and evaporator 108. The refrigeration system operates to circulate a refrigerant around the system to enable the transfer of heat into and out of the system. As is known, the compressor 102 compresses a refrigerant gas whereby the compressed refrigerant passes through a condenser 104 wherein heat from the compressed refrigerant is given off. Thereafter, the compressed refrigerant passes through an expansion valve 106 wherein the compressed refrigerant is allowed to expand to a gas which absorbs heat when passed through an evaporator coil system 108 and returned to the compressor 102. At both the condenser side 104 and evaporator side 108, heat exchangers 110 and 112 respectively may be configured to the refrigeration system 100 to allow heat to efficiently move into or out of the system 100.

A cooling system 120 is connected to the evaporator side 108 of the refrigeration system 100 through heat exchanger 112 to allow cooling of a water based cooling solution such as a water/alcohol mixture. Heat from the cooling system 120 is given up to the evaporator 108 thereby cooling the water solution within the cooling system 120. The cold water solution may be stored in an optional but preferred holding tank 122 from which it is delivered to a cooler 124 through separate flow paths 126a and 126b (sides I and II) to a cooling coil system 128 within the cooler 124. The cold storage tank is preferably provided in order to provide thermal mass in the event of sudden loads being placed on the system such as loading a freezer or cooler.

The separate and distinct flow paths 126a and 126b allow each side of the cooling coil system 128 to be independently defrosted which in addition to providing efficient defrosting also enhances the building atmospheric dehumidification, explained in greater detail below. The cold fluid circulating through the cooler 124 receives heat from the contents of the cooler 124, such as food, thereby cooling the cooler contents. Fluid is returned to the heat exchanger 112 through pump 130.

A defrost system 150 is also connected to the cooler 124 to allow the cooling coils 128 to be defrosted. The defrost system is a closed coil system containing a defrost fluid of the same composition as the cooling solution described above. The defrost system overlaps with the cooling system 120 in the region of the cooler 124. Specifically, the cooling coils 128 include a shared flow path between valves A and B and C and D which allows the defrost fluid to be circulated through the cooling coils 128. Preferably, the defrost loop 150 is closed in order to prevent contamination of the cooling fluid. The defrost system 150 includes a pump 152 for circulating the fluid within the loop. The defrost fluid is heated by heat exchanger 154, preferably a counter-current coil-in-coil heat exchanger.

Heating of the defrost fluid is preferably obtained from a heat storage system 160 deriving heat from the heat rejected by the cooler 124 through the cooling system and the compressor 100 of the refrigeration system. The heat storage system 160 includes a pump 162 for circulating fluid through the heat storage system 160. The heat storage system is connected to heat exchanger 154 and heat exchanger 164 thereby forming a closed loop. As an option, the heat storage system 160 includes a heat storage tank 166 for holding a volume of heating fluid (normally water) which may be used for a building heating system 170 or to provide heating if sudden loads are placed on the system.

The heating system 170 includes a pump 172 for pumping fluid to a specific heating system 174. The specific heating system 174 may be an infloor radiant heating system or water/air heating system. A valve E may be controlled to effect flow of fluid to the secondary heating system 174. The heating system 160 preferably receives heat from the coolers 124 and compressor 102 through the condenser 104 of the refrigeration system 100. In one embodiment, the connection of the heating system loop 160 could be direct to the heat exchanger 110.

In a preferred embodiment, a geothermal system 180 is provided between heat exchangers 110 and 164 which is further connected to supply well 182 and return well 184 and/or ground loop 186. The circulation of fluid through the geothermal system is accomplished by pumps 188 and 190. The specific flow of fluid is directed by valves F and G which may be used to selectively direct fluid through heat exchanger 110 only or through both heat exchangers 110 and 164. Valves F and G may also be utilized in order to enable the circulation of fluid through the ground loop 186 or from supply well 182 and return well 184 through pump 190.

In a still further embodiment, heating/cooling system 200 may be configured directly to the ground loop 180 system 180 which may also incorporate a heat/cold storage tank 202. The heating/cooling system 200 may operate according to the principles of a standard ground source heat pump.

Figure 2A:
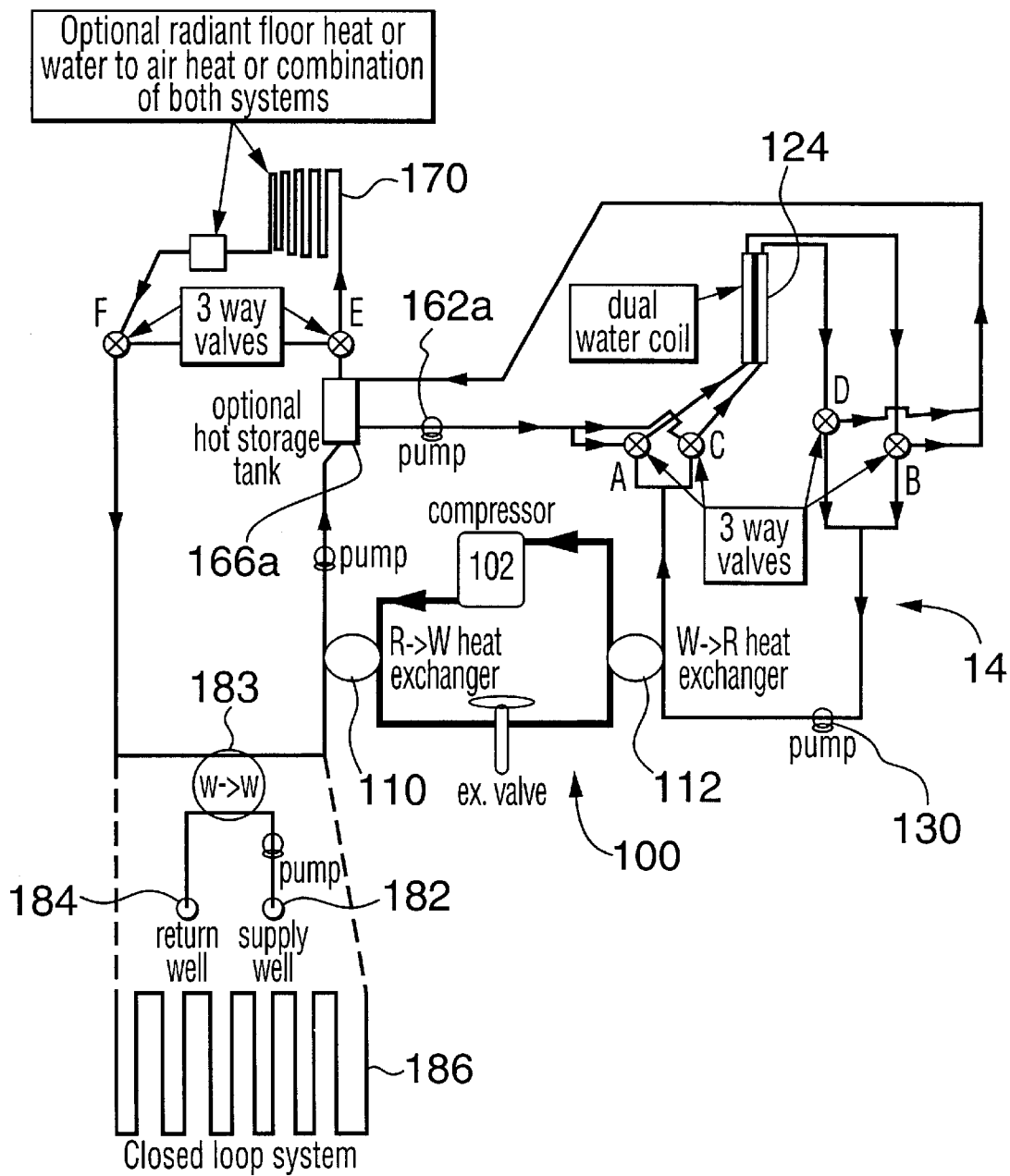
FIG. 2A is a schematic drawing a second embodiment of the heating, cooling and dehumidification system in accordance with the invention.

FIG. 2A shows an embodiment wherein the defrost system and heating systems of the building are unified into a single closed loop. In this embodiment, a refrigeration circuit 100 and cooling system 14 are provided as described previously. In this embodiment, a closed loop heating system is provided to extract heat from the refrigeration circuit 100 and from the ground source system such as a closed loop coil 186 or open loop system using supply 182 and return 184 wells. If an open loop system is used, a water/water heat exchanger 183 may be provided in order to prevent heating fluid contamination.

The heating system extracts heat from refrigeration circuit 110 which may be optionally stored in storage tank where it may be used to provide heat for defrosting the coolers 124 through operation of pump 162a and 3-way valves A, B, C and D as described previously. Furthermore, the system may include an optional heating system 170 such as in-floor radiant floor heating and/or a water/air heating system. The heating system 170 would receive heat through the operation of valves E and F. Preferably, the closed loop will use a clean heating fluid such as a water/alcohol solution.

Figure 2B:
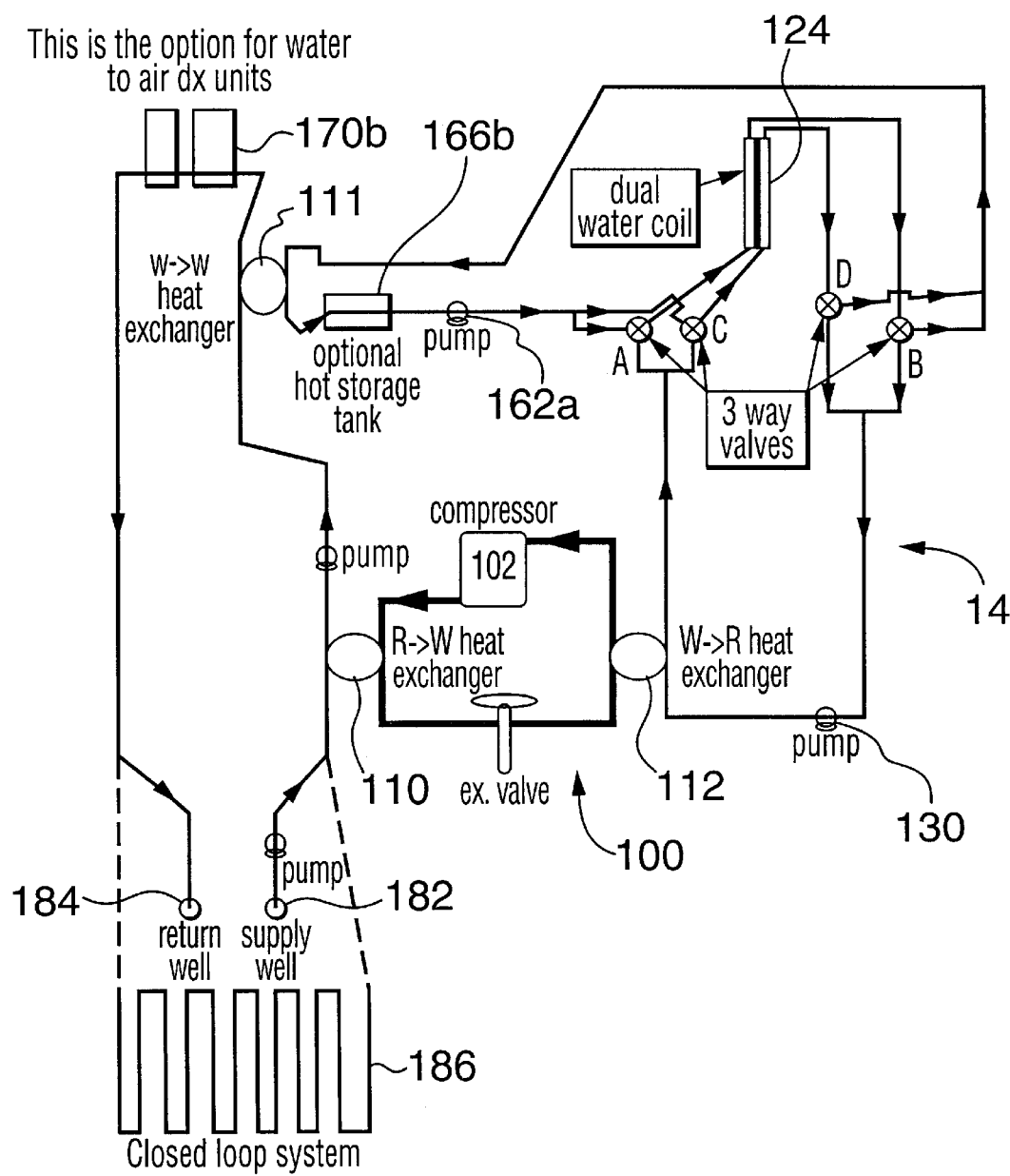
FIG. 2B is a schematic drawing a further embodiment of the heating, cooling and dehumidification system in accordance with the invention.

A still further embodiment is shown in FIG. 2B. In this embodiment, the building heating system utilizes separate water/air heating units 170b to extract heat from a ground loop 186 or open loop from supply 182 and return 184 wells. The defrost system is a separate closed loop which obtains heat from the refrigeration circuit 100 through refrigerant/water heat exchanger 110b and water/water heat exchanger 111.

Figure 3:
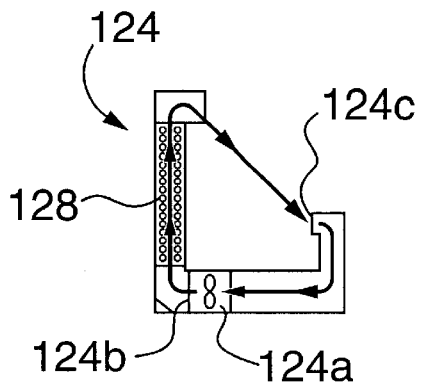
FIG. 3 is a schematic cutaway drawing of a typical grocery freezer cooler.
Figure 3A:
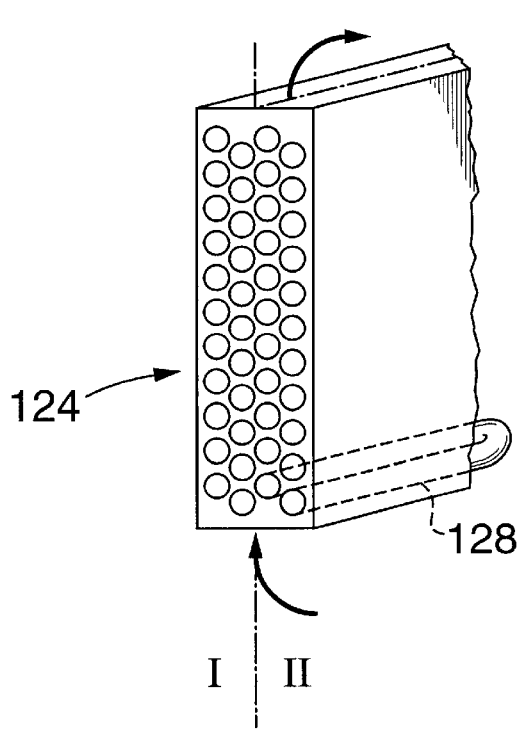
FIG. 3A is a schematic cutaway of a rack of coiling coils 128 in accordance with the invention; and, FIG. 3B is a schematic representation of a cooling rack showing air flow through a cooling rack.
Figure 3B:
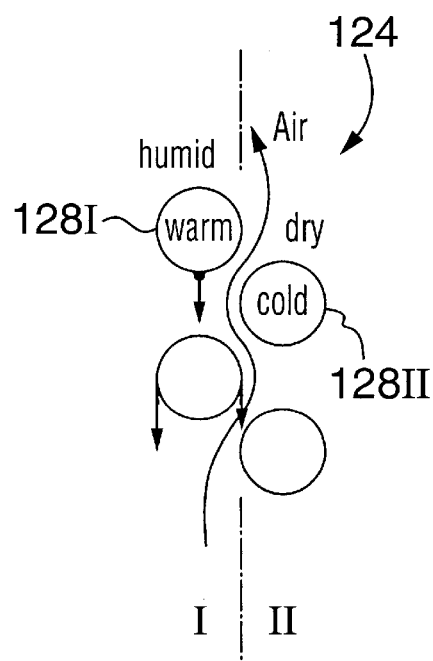

With reference to FIG. 3, a schematic cutaway drawing of a typical cooler 124 is shown. FIG. 3A is a schematic cutaway of a rack of coiling coils 128 in accordance with the invention and FIG. 3B shows the air flow through a cooling rack 128. In a typical cooler or freezer, a rack of cooling coils is located at the back of the freezer/cooler 124 with a fan or blower 124a positioned beneath the cooling coils 128 to circulate air upwards and through the coiling coils 128. Air passing over the coils is cooled, whereupon, it exits the top of the cooler/freezer and is directed toward an intake 124c whereupon it is re-directed to the fan/blower 124a. Thereby, through the circulation of air through the cooling coils 128 and the circulation of a cooling fluid through the coils 128, the temperature within the freezer/cooler is reduced. In accordance with the invention, the cooling coils of the rack are separated into two distinct flow paths, designated I and II in FIG. 3A. Generally, each side of the rack includes a series of looped piping which passes back and forth across the rack to provide a large surface area to enable effective heat transfer between the cooling fluid flowing through the piping and the air flowing over the piping 128. By providing separate flow paths, the flow of cooling fluid through each side I and II of the rack can be independently controlled.

For example, and with reference to FIG. 2, during normal cooling operation, a cooling fluid is circulated through both sides I and II of the rack. In this mode valves, A, B, C and D (typically 3-way valves) are opened to allow fluid flow through the cooling circuit 120 and not through defrost loop 150. At an appropriate time, where it is desired to defrost one side of the rack, for example side I, valves A and B would be closed to prevent cooling fluid through side I but opened to allow the flow of defrost fluid through side I under the control of pump 152. Accordingly, by circulating a warm/hot defrost fluid through side I, side I is defrosted. Furthermore, as a result of the thermal mass of the defrost fluid, defrosting is accomplished very quickly wherein the frost on side I is melted and rapidly drips away from the cooling rack. As a result of the rapid defrosting time, and the continued flow of cooling fluid flowing through side II during defrosting of side I, the temperature within the cooler/freezer does not rise substantially. Melted water from defrosting is allowed to drain away from the system.

Upon completion of defrosting side I, valves A and B are returned to their original configuration and side I is cooled by cooling fluid. Similarly, in order to defrost side II, valves C and D are manipulated in a similar manner as for side I described above.

A particular advantage which is realized by this system is the effective and efficient dehumidification of a bulding. Dehumidification of a building is necessary, particularly in the summer months, in order to prevent excessive build-up of frost on the surfaces of the food products within a cooler/freezer as well as on the cooling coils. That is, if the relative humidity within the building is too high, the water vapour in the air will rapidly condense within the open coolers/freezers leading to a build-up of frost. Thus, it becomes necessary to control the humidity in order that customers can see the food products and to ensure that the refrigeration system operates efficiently.

With reference to FIG. 3B, the dehumidification process in accordance with the invention is explained wherein the two sides of a cooling rack 124 are similarly represented as I and II having cooling tubes 128 which overlap with respect to one another. During the defrosting cycle for side I, a defrost fluid is allowed to circulate through side I of the cooling rack 124 while cooling fluid flows through side II. Air flow continues to flow upwardly through the rack 124. As a result of the defrost fluid flowing through side I, any frost which may have built up on the exterior of the tubes 128I will melt forming water droplets which will fall away from each tube whereupon the water will collect at the bottom of the cooler 124b and allowed to drain away from the system.

Accordingly, by effectively removing condensed water vapour from the atmosphere of the building, the defrost cycle will also dehumidify the building atmosphere.

More specifically, however, the defrost cycle as provided by the dual flow path system will control humidity more effectively than a system which does not employ a dual flow path. In a single flow path system, at the time a defrost cycle is initiated, the melting of frost on the exterior of a cooling tube will immediately increase the relative humidity in the proximity of the cooling tube by virtue of a proportion of the melted water becoming vapour. Accordingly, also as a result of the continued circulation of air and the time required for defrosting, during the defrost cycle, the cooler will give back to the atmosphere some of the vapour which had been previously removed.

In the present system, this proportion of water vapour given back to the atmosphere is reduced significantly as any newly formed water vapour will be circulated through a system of tubes which are alternately warm and cold and overlapping. Accordingly, as a result of this tortuous path, the cooling tubes will continue to have a dehumidifying effect throughout the defrost cycle as warm, humid air is in contact with dry, cold air. This can lead to dramatic increases in the overall dehumidifying process for a building.

Operation of the System

As indicated above, in addition to providing the primary functions of providing cooling energy to coolers/freezers 1, the system also enables de-humidification of a building atmosphere as well as building heating in the winter.

Defrost Cycle

As a result of the thermal mass of a water based defrost solution, complete defrosting of one side of a cooling rack can be accomplished within 1–2 minutes of the initiation of the defrost cycle. Furthermore, during the defrost cycle, a freezer/cooler having an ambient air temperature of 0 degrees F. (−20° C.) will see an ambient temperature rise of only 5–10° F. Accordingly, in most situations, at no time will the temperature of the circulating air rise above 32° F. wherein food would potentially thaw.

General Operation

System efficiencies achieved with the subject invention in comparison to efficiencies achieved with conventional heating and cooling systems for grocery stores are substantial. For example, energy efficiency ratios (EER) for traditional refrigerant/air systems would be in the order of 4–6%, that is 4–6 BTU of cooling would be obtained for each Watt of energy used to operate the system. In a conventional system waste heat is often rejected to 120° F. air which is a more difficult thermal bridge to cross compared to rejecting heat to a water system.

More specifically, the above EER is compared to an EER for the subject system in the range of 18% wherein heat is rejected from a hot gas at 60° F. to a liquid at 48° F. which is a more efficient thermal bridge.

Winter Operation

In winter, cooling for the coolers/freezers 1 is required and heat for the building is required. Accordingly, waste heat from the coolers/freezers 1 and from the system compressor 102 is directed to the heat storage 19 and heating system 20. During winter operation, geothermal energy may or may not be required for heating. In a typical grocery store installation, the total cooling requirement may be 200,000 BTU and the heating requirement 400,000 BTU. Accordingly, the 200,000 BTU waste heat from the coolers may be directed to the building. In addition, the heat generated by the compressors 102 may also be directed to the building to make up the total 400,000 BTU heating requirement. In the event that the heating requirement is greater than the capacity of waste heat from the coolers 1 and the compressors 102, the system will obtain additional energy from the geothermal system 18.

In the event that the total heating requirements of the building are less than the total amount of heat available from the compressors 102 and coolers 1, excess heat is delivered to the geothermal system 18 for dissipation to the ground.

Summer Operation

In summer, all excess heat from the freezers 1 and compressors 102 is waste heat and is discarded either through geothermal system 18 or to the external atmosphere. In the event that building cooling is also required, ground source cooling may also be effected utilizing a ground source heat pump.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

What is claimed is:

1. A heat management system for a building, the heat management system comprising:
    at least one cooling device;
    a refrigeration system in heat exchange contact with a cooling system for providing cooling energy to the cooling system, the cooling system including at least two independent flow paths in heat exchange contact with the cooling device for cooling the cooling device with a non-compressible liquid;
    a defrost system in heat exchange contact with the cooling device through each respective independent flow path wherein the defrost system includes means to independently defrost each independent flow path within the cooling device with a non-compressible liquid while maintaining cooling to the cooling device.

2. A heat management system as in claim 1 wherein each of the independent flow paths includes a plurality of cooling coils defining first and second sides of the cooling system wherein the cooling coils of the first and second sides partially overlap and intermingle with the cooling coils of the other side.

3. A heat management system as in claim 2 wherein the overlapping first and second sides define a non-linear boundary and wherein the cooling system includes an air flow system for circulating air over the cooling system for effecting heat transfer between the air and the cooling system.

4. A heat management system as in claim 3 wherein the cooling system is adapted so that air flowing over the coiling coils of the cooling system follows a tortuous path at the boundary between the first and second sides.

5. A heat management system as in claim 1 wherein a cold storage system is operatively connected to the cooling system.

6. A heat management system as in claim 1 wherein the defrost system is in heat exchange contact with the refrigeration system to receive heat from the refrigeration system for defrosting.

7. A heat management system as in claim 1 wherein a heat storage system is operatively connected to the defrost system.

8. A heat management system as in claim 1 wherein the defrost system further includes a building heating system operatively connected to the defrost system for transferring heat to the building.

9. A heat management system as in claim 8 wherein the building heating system is any one of or a combination of a radiant floor heating system or a water/air heat pump system.

10. A heat management system as in claim 1 wherein the system is further adapted to transfer waste heat from the refrigeration system and/or building to a geothermal system.

11. A heat management system comprising:
    at least one cooling device;
    a refrigeration system in heat exchange contact with a cooling system for providing cooling energy to the cooling system, the cooling system including:
        at least two independent flow paths in heat exchange contact with the cooling device for cooling the cooling device;
        a plurality of cooling coils defining first and second sides of the cooling system wherein the first and second sides are positioned so as to partially overlap with the other side and define a non-linear boundary;
        an air flow system for circulating air over the cooling coils for effecting heat transfer between the air and the cooling system; and,
        a cold storage system operatively connected to the independent flow paths;
    a defrost system in heat exchange contact with the cooling device through each respective independent flow path, the defrost system also in heat exchange contact with the refrigeration system to receive heat from the refrigeration system for defrosting wherein the defrost system also includes means to independently defrost each independent flow path.

12. A heat management system as in claim 11 wherein a heat storage system is operatively connected to the defrost system.

13. A heat management system as in claim 11 wherein a building heating system is operatively connected to the defrost system for transferring heat to the building.

14. A heat management system as in claim 13 wherein the building heating system is any one of or a combination of a radiant floor system or a water/air heat pump system.

15. A heat management system as in claim 11 wherein the system is further adapted to transfer waste heat from the refrigeration system and/or building to a geothermal system.

* * * * *